(12) United States Patent
Nozaki et al.

(10) Patent No.: US 7,377,373 B2
(45) Date of Patent: May 27, 2008

(54) HYDRAULIC CONTROL APPARATUS FOR HYDRAULIC POWER TRANSMISSION WITH LOCK-UP CLUTCH

(75) Inventors: Kazutoshi Nozaki, Aichi-gun (JP); Atsushi Tabata, Okazaki (JP); Atsushi Honda, Seto (JP); Akiharu Abe, Toyota (JP); Yuji Inoue, Nisshin (JP); Hirofumi Ota, Toyota (JP); Atsushi Kamada, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 315 days.

(21) Appl. No.: 11/352,343

(22) Filed: Feb. 13, 2006

(65) Prior Publication Data

US 2006/0196746 A1    Sep. 7, 2006

(30) Foreign Application Priority Data

Mar. 4, 2005    (JP) .............................. 2005-061569

(51) Int. Cl.
    *F16H 61/14* (2006.01)
(52) U.S. Cl. ...................... 192/3.3; 74/732.1; 477/169
(58) Field of Classification Search ..................... None
    See application file for complete search history.

(56) References Cited

U.S. PATENT DOCUMENTS 5,527,233 A * 6/1996 Tabata et al. ................. 477/62
5,569,117 A * 10/1996 Kono et al. .................. 477/176
5,613,583 A * 3/1997 Kono et al. .................. 477/176
5,779,595 A * 7/1998 Kono et al. .................. 477/176
6,474,456 B2 * 11/2002 Suzuki et al. ............... 192/3.29
6,662,918 B2 * 12/2003 Takeuchi et al. ........... 192/3.29

FOREIGN PATENT DOCUMENTS

| DE | 197 17 355 A1 | 11/1997 |
|----|---------------|---------|
| DE | 698 06 837 T2 | 4/2003  |
| JP | 5-99331       | 4/1993  |

* cited by examiner

*Primary Examiner*—Rodney H Bonck
(74) *Attorney, Agent, or Firm*—Oblon, Spivak, McClelland, Maier & Neustadt, P.C.

(57) ABSTRACT

Engagement, disengagement, and slip of a lock-up clutch can be controlled using two valves that are a lock-up relay valve and a linear solenoid valve. A lock-up control valve employed in a conventional hydraulic control apparatus can be eliminated, which simplifies the configuration, and reduces the size of a hydraulic control apparatus for a torque converter with a lock-up clutch. When the lock-up clutch is engaged, hydraulic pressure output from the linear solenoid valve is supplied to a disengagement-side oil chamber of the torque converter, and a pressure difference between the engagement-side oil chamber and the disengagement-side oil chamber is applied to a spool valve element of the linear solenoid valve. Therefore, the spool valve element is driven such that an electromagnetic force applied from a linear solenoid becomes equal to the pressure difference.

4 Claims, 6 Drawing Sheets

FIG. 2

| SHIFT POSITION | | SOLENOID | | $C_1$ | $C_2$ | $B_1$ | $B_2$ | $F_1$ | $B_3$ | $F_2$ | $C_0$ | $F_0$ | $B_0$ |
|---|---|---|---|---|---|---|---|---|---|---|---|---|---|
| | | No.1 | No.2 | | | | | | | | | | |
| P | | ⊗ | ⊗ | | | | | | | | ○ | | |
| R | | ⊗ | ⊗ | | ○ | | | | ○ | | ○ | | |
| N | | ⊗ | ⊗ | | | | | | | | ○ | | |
| D | 1st | ○ | × | ○ | | | | | | | ○ | ○ | |
| | 2nd | ○ | ○ | ○ | | | ○ | | | ○ | ○ | ○ | |
| | 3rd | × | ○ | ○ | ○ | | ○ | ○ | | | ○ | ○ | |
| | O/D | × | × | ○ | ○ | | ○ | ○ | | | | | ○ |
| S | 1st | ○ | × | ○ | | | | | | | ○ | ○ | |
| | 2nd | ○ | ○ | ○ | | | ○ | | | ○ | ○ | ○ | |
| | 3rd | × | ○ | ○ | ○ | | ○ | ○ | | | ○ | ○ | |
| | (O/D) | × | × | ○ | ○ | | ○ | ○ | | | | | ○ |
| L | 1st | ○ | × | ○ | | | | | ○ | | | ○ | |
| | 2nd | ○ | ○ | ○ | | ○ | ○ | ○ | ○ | ○ | ○ | ○ | |

HYDRAULIC CONTROL APPARATUS FOR HYDRAULIC POWER TRANSMISSION WITH LOCK-UP CLUTCH

INCORPORATION BY REFERENCE

The disclosure of Japanese Patent Application No. 2005-061569 filed on Mar. 4, 2005, including the specification, drawings and abstract is incorporated herein by reference in its entirety.

BACKGROUND OF THE INVENTION

1. Field of the Invention

The invention relates to a hydraulic control apparatus for a hydraulic power transmission with a lock-up clutch for a vehicle.

2. Description of Related Art

There are vehicles provided with a hydraulic power transmission with a lock-up clutch, such as a torque converter with a lock-up clutch or a fluid coupling with a lock-up clutch. Hydraulic control apparatuses for such hydraulic power transmissions with a lock-up clutch have been proposed. For example, the hydraulic control apparatuses may direct the lock-up clutch to slip to absorb periodic torque fluctuations of an engine when a vehicle runs at low speeds. Japanese Patent Application Publication No. JP-A-5-99331 describes an example of such hydraulic control apparatuses. The hydraulic control apparatus described includes a lock-up relay valve; a lock-up control valve; and a linear solenoid valve. The lock-up relay valve is switched between two positions in response to the operation of a switching electromagnetic valve such that the lock-up clutch is engaged or disengaged. The lock-up control valve adjusts the pressure of hydraulic oil flowing from the hydraulic power transmission when the lock-up relay valve is switched to the engaged position, thereby controlling the engagement of the lock-up clutch. The linear solenoid valve outputs a signal pressure applied to a spool valve element to control the lock-up control valve. That is, the lock-up control valve controls the engagement, the disengagement, and the slip state of the lock-up clutch.

As described above, the conventional hydraulic control apparatus for a hydraulic power transmission with a lock-up clutch for a vehicle includes the lock-up relay valve and the lock-up control valve in addition to the switching electromagnetic valve and the linear solenoid valve. Each of the lock-up relay valve and the lock-up control valve includes a spool valve element. Therefore, the configuration of the hydraulic control apparatus is complex, which increases size of the hydraulic control apparatus.

SUMMARY OF THE INVENTION

The invention provides a hydraulic control apparatus with a simplified configuration and reduced size.

An aspect of the invention relates to a hydraulic control apparatus for a hydraulic power transmission with a lock-up clutch, where the lock-up clutch operates in accordance with a pressure difference between an engagement-side oil chamber and a disengagement-side oil chamber. The hydraulic control apparatus includes a lock-up relay valve; and a linear solenoid valve. The lock-up relay valve is switched between a first position and a second position by a switching electromagnetic solenoid. When the lock-up relay valve is placed in the first position, hydraulic pressure is supplied to the engagement-side oil chamber, and when the lock-up relay valve is placed in the second position, the hydraulic pressure is supplied to the disengagement-side oil chamber. The linear solenoid valve includes a spool valve element driven using an electromagnetic force, and adjusts hydraulic pressure output from the linear solenoid valve. An oil passage is provided through which the hydraulic pressure output from the linear solenoid valve is supplied to the disengagement-side oil chamber via the lock-up relay valve when the lock-up relay valve is in the first position, and oil passages are respectively provided through which hydraulic pressure in the engagement-side oil chamber is applied to one end of the spool valve element of the linear solenoid valve, and hydraulic pressure in the disengagement-side oil chamber is applied to the other end of the spool valve element.

With this configuration, the lock-up clutch is engaged by placing the lock-up relay valve in the first position; and disengaged by placing the lock-up relay valve in the second position. When the lock-up clutch is engaged, the hydraulic pressure output from the linear solenoid valve is supplied to the disengagement-side oil chamber of the hydraulic power transmission. The pressure difference between the engagement-side oil chamber and the disengagement-side chamber is applied to the spool valve element of the linear solenoid valve. Thus, the spool valve element is driven such that the electromagnetic force applied from a linear solenoid becomes equal to the pressure difference. Accordingly, the hydraulic pressure output from the linear solenoid valve can be adjusted so that the pressure difference becomes a desirable value. That is, engagement, disengagement and slip of the lock-up clutch can be controlled using the two valves, i.e., the lock-up relay valve and the linear solenoid valve. Accordingly, a lock-up control valve employed in the conventional hydraulic control apparatus is omitted. This simplifies the configuration and reduces the size of the hydraulic control apparatus for the torque converter with the lock-up clutch.

BRIEF DESCRIPTION OF THE DRAWINGS

The features, advantages thereof, and technical and industrial significance of this invention will be better understood by reading the following detailed description of the example embodiments of the invention, when considered in connection with the accompanying drawings, in which:

FIG. 2 illustrates a table showing the relation between shift speeds and the combination of the operations of the first electromagnetic valve and the second electromagnetic valve in an automatic transmission included in the hydraulic power transmission shown in FIG. 1;

DETAILED DESCRIPTION OF THE EXEMPLE EMBODIMENTS

In the following description and the accompanying drawings, the present invention will be described in more detail with reference to example embodiments.

Figure 1:
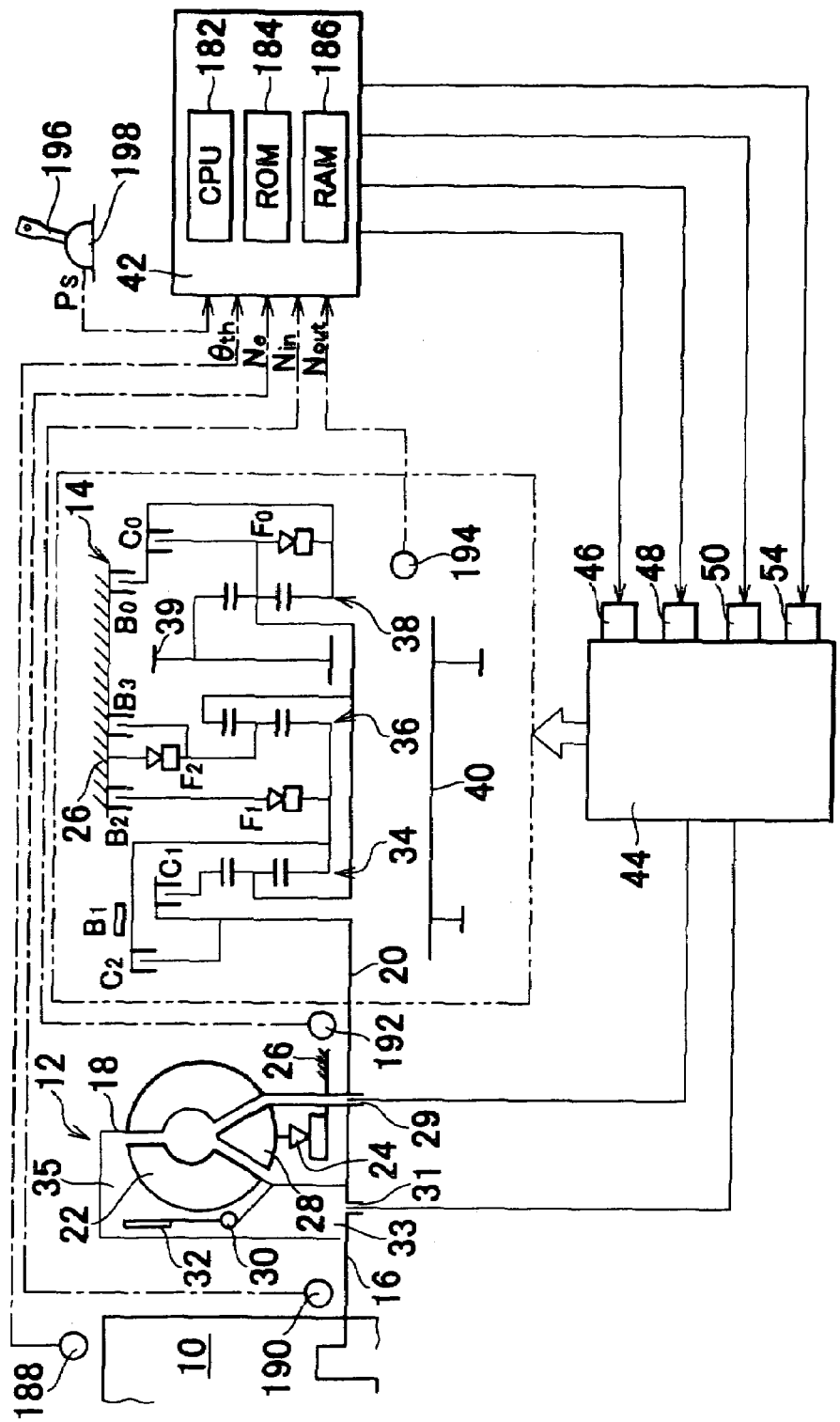
FIG. 1 illustrates a diagram showing a power transmission for a vehicle to which a hydraulic control apparatus according to an embodiment of the invention is applied.

FIG. 1 illustrates a schematic diagram showing a power transmission for a vehicle to which a hydraulic control apparatus according to an embodiment of the invention is applied. In FIG. 1, power output from an engine 10 is transmitted to driving wheels via a torque converter 12 with a lock-up clutch, a stepped automatic transmission 14, and a differential gear unit (not shown), and the like. The torque converter 12 with the lock-up clutch is a hydraulic power transmission. The stepped automatic transmission 14 includes three sets of planetary gear units.

The torque converter 12 includes a pump impeller 18; a turbine runner 22; a stator impeller 28; a lock-up clutch 32; an engagement-side port 29 and a disengagement-side port 31. The pump impeller 18 is connected to a crankshaft 16 of the engine 10. The turbine runner 22 is fixed to an input shaft 20 of the automatic transmission 14, and is rotated by oil delivered from the pump impeller 18. The stator impeller 28 is fixed to a housing 26, which is a non-rotating member, via a one-way clutch 24. The lock-up clutch 32 is connected to the input shaft 20 via a damper 30. The hydraulic oil for the torque converter 12 is supplied through the engagement-side port 29 and is discharged through the disengagement-side port 31. The space inside the torque converter 12 is divided into an engagement-side oil chamber 35 and a disengagement-side oil chamber 33 by the lock-up clutch 32. Communication is provided between the engagement-side oil chamber 35 and the engagement-side port 29, and between the disengagement-side oil chamber 33 and the disengagement-side port 31. If the hydraulic pressure in the disengagement-side oil chamber 33 becomes higher than that in the engagement-side oil chamber 35, the lock-up clutch 32 disengages. As a result, torque is amplified at an amplification ratio corresponding to the ratio between the input rotational speed and the output rotational speed of the torque converter 12. If the hydraulic pressure in the engagement-side oil chamber 35 becomes higher than that in the disengagement-side oil chamber 33, the lock-up clutch 32 engages. As a result, the crankshaft 16 is directly connected to the input shaft 20 that are input/output members of the torque converter 12.

The automatic transmission 14 includes three sets of single pinion planetary gear units 34, 36, and 38; the input shaft 20; the output gear 39; and a counter shaft (output shaft) 40. The planetary gear units 34, 36, and 38 are provided on the same axis. The output gear 39 rotates together with the ring gear of the planetary gear unit 38. Power is transmitted between the differential gear unit and the counter shaft (output shaft) 40. Some components of the planetary gear units 34, 36, and 38 are integrally connected to each other. Also, some components of the planetary gear units 34, 36, and 38 are selectively connected to each other by three clutches C0, C1, and C2. Also, some components of the planetary gear units 34, 36, and 38 are selectively connected to the housing 26 by four brakes B0, B1, B2, and B3. Further, some of the components are engaged with each other or engaged with the housing 26 by three one-way clutches F0, F1, and F2.

Each of the clutches C0, C1, and C2, and the brakes B0, B1, B2, and B3 is composed of a multiple disc clutch, a band brake, or the like. The band brake includes one band or two bands that are wound in opposite directions. Each of the clutches and the brakes is operated by a hydraulic actuator. An electronic control unit 42 (described later) controls the hydraulic actuators for the clutches and the brakes, thereby achieving four forward speeds and one reverse speed shown in FIG. 2. The speed ratios I (i.e., the rotational speed of the input shaft 20/the rotational speed of the counter shaft 40) are different at each speed. In FIG. 2, "$1^{st}$" "$2^{nd}$" "$3^{rd}$" "O/D (overdrive)" indicate the four forward shift speeds, i.e., the first speed, second speed, third speed and fourth speed, respectively. The speed ratio decreases from the first speed toward the fourth speed. Because both the torque converter 12 and the automatic transmission 14 are symmetric with respect to the axis of the input shaft 20, portions of the torque converter 12 and the automatic transmission 14 below the input shaft 20 and above the counter shaft 40 are not shown in FIG. 1.

A hydraulic control circuit 44 includes a hydraulic shifting-control circuit 44a; and a hydraulic clutch-control circuit 44b. The hydraulic shifting-control circuit 44a controls the shift speeds of the automatic transmission 14. The hydraulic clutch-control circuit 44b controls the lock-up clutch 32. The hydraulic shifting-control circuit 44a includes a first electromagnetic valve 46 and a second electromagnetic valve 48. The first electromagnetic valve 46 and the second electromagnetic valve 48 are well-known electromagnetic valves that are operated by solenoids No. 1 and No. 2, respectively. The clutches C0, C1, and C2, and the brakes B0, B1, B2, and B3 are selectively operated as shown in FIG. 2, by combining the operations of the first electromagnetic valve 46 and the second electromagnetic valve 48. By selectively operating the clutches C0, C1, and C2, and the brakes B0, B1, B2, and B3, any one of the first to fourth speeds may be achieved. The engagement pressures of the clutches C0, C1, and C2, and the brakes B0, B1, B2, and B3 may be directly controlled by respective pressure control valves.

Figure 3:
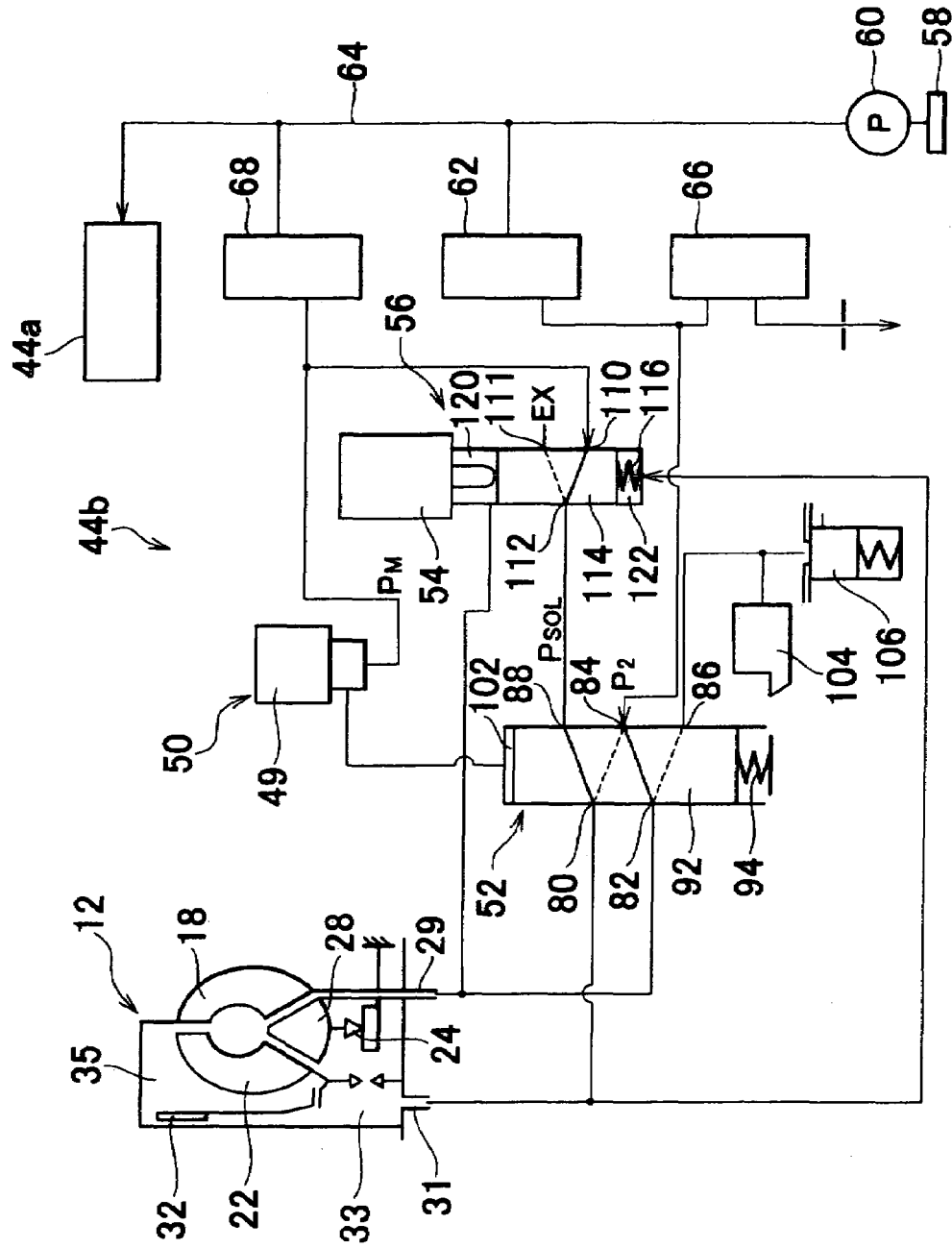
FIG. 3 illustrates a diagram showing the configuration of the main portion of a hydraulic control circuit shown in FIG. 1.

For example, the hydraulic clutch-control circuit 44b includes a third electromagnetic valve 50; a lock-up relay valve (clutch-switching valve) 52; and a linear solenoid valve (slip control valve) 56, as shown in FIG. 3. The third electromagnetic valve 50 is operated by a switching electromagnetic solenoid 49. The third electromagnetic valve 50 generates a switching signal pressure $P_{SW}$. The lock-up relay valve (clutch switching valve) 52 is switched between an engaged position (first position) and a disengaged position (second position), according to the switching signal pressure $P_{SW}$ generated by the third electromagnetic valve 50. If the lock-up relay valve 52 is placed in the first position, the lock-up clutch 32 is engaged. If the lock-up relay valve 52 is placed in the second position, the lock-up clutch 32 is disengaged. The linear solenoid valve (slip control valve) 56 includes a linear solenoid 54 that generates a thrust $F_{SOL}$ to control slip according to a drive electric current $I_{SOL}$ supplied from the electronic control unit 42. The linear solenoid valve 56 continuously adjusts a pressure difference $\Delta P (=P_{ON}-P_{OFF})$ between the engagement-side oil chamber 35 and the disengagement-side oil chamber 33 according to the thrust $F_{SOL}$ output from the linear solenoid 54, thereby controlling a slip amount of the lock-up clutch 32. In the embodiment, the third electromagnetic valve 50 and the lock-up relay valve 52 engages or disengages the lock-up clutch 32. The linear solenoid valve 56 including the linear solenoid 54 controls the slip state of the lock-up clutch 32.

The hydraulic control circuit 44 is provided with a pump 60. The pump 60 is driven by an engine 10 to draw the hydraulic oil that has flown back to a tank (not shown) using a strainer 58, and to deliver the hydraulic oil. The pressure of the hydraulic oil delivered from the pump 60 is adjusted to a first line pressure $P_1$ by a first relief valve (overflow valve). That is, the first relief valve 62 regulates the first line pressure $P_1$ in a first line 64. The first line pressure $P_1$ increases in accordance with the throttle pressure output from a valve that detects the opening amount of the throttle valve. The second relief valve (overflow valve) 66 adjusts the pressure of the hydraulic oil flowing from the first relief valve 62 based on the throttle pressure, thereby generating a second line pressure $P_2$ corresponding to the output torque of the engine 10. The third relief valve 68 reduces the first line pressure $P_1$ to a constant modulator pressure (third line pressure) $P_M$ that is set in advance.

The lock-up relay valve 52 includes a disengagement-side port 80; an engagement-side port 82; an input port 84; a first discharge port 86; a second discharge port 88; a spool valve element 92; a spring 94; and an oil chamber 102. The disengagement-side port 80 is connected to the disengagement-side oil chamber 33. The engagement-side port 82 is connected to the engagement-side oil chamber 35. The second line pressure $P_2$ is supplied to the input port 84. The hydraulic oil is discharged from the engagement-side oil chamber 35 through the first discharge port 86 when the lock-up clutch 32 is disengaged. The hydraulic oil is discharged from the disengagement-side oil chamber 33 through the second discharge port 88 when the lock-up clutch 32 is engaged. The spool valve element 92 changes the connection between the ports. The spring 94 pushes the spool valve element 92 toward an OFF position. If the oil chamber 102 receives a switching signal pressure $P_{SW}$ sent from the third electromagnetic valve 50, the switching signal pressure $P_{SW}$ is applied to an end surface of the spool valve element 92, which generates the thrust to push the spool valve element 92 toward an ON position.

If the third electromagnetic valve 50 is not excited, the third electromagnetic valve 50 adjusts the switching signal pressure $P_{SW}$ to a drain pressure. If the third electromagnetic valve 50 is excited, the third electromagnetic valve 50 adjusts the switching signal pressure $P_{SW}$ to the modulator pressure $P_M$ so that the modulator pressure $P_M$ is applied to the oil chamber 102. Therefore, if the third electromagnetic valve 50 is not excited, the switching signal pressure $P_{SW}$ from the third electromagnetic valve 50 is not substantially applied to the oil chamber 102, and the spool valve element 92 is placed in the OFF position due to the force of the spring 94. This permits communication between the input port 84 and the disengagement-side port 80, and between the engagement-side port 82 and the first discharge port 86. As a result, a disengagement-side pressure $P_{OFF}$ in the disengagement-side oil chamber 33 becomes higher than an engagement-side pressure $P_{ON}$ in the engagement-side oil chamber 35 so that the lock-up clutch 32 disengages. At the same time, the hydraulic oil in the engagement-side oil chamber 35 is discharged to a drain through the first discharge port 86, an oil cooler 104, and a check valve 106.

If the third electromagnetic valve 50 is excited, the switching signal pressure $P_{SW}$ from the third electromagnetic valve 50 is applied to the oil chamber 102, and the spool valve element 92 is placed in the ON position against the force of the spring 94. This permits communication between the input port 84 and the engagement-side port 82, and between the disengagement-side port 80 and the second discharge port 88. As a result, the engagement-side pressure $P_{ON}$ in the engagement-side oil chamber 35 becomes higher than the disengagement-side pressure $P_{OFF}$ in the disengagement-side oil chamber 33 so that the lock-up clutch 32 engages. At the same time, the hydraulic oil is discharged from the disengagement-side oil chamber 33 to the drain through the second discharge port 88 and the linear solenoid valve 56. As shown in FIG. 3, the spool valve element 92 switches the lock-up relay valve 52 between the first position and the second position. In FIG. 3, oblique solid lines indicate the first position, and oblique dashed lines indicate the second position. If the lock-up relay valve 52 is placed in the first position, the lock-up clutch 32 is engaged. If the lock-up relay valve 52 is placed in the second position, the lock-up clutch 32 is disengaged.

The linear solenoid valve 56 includes the linear solenoid 54. The linear solenoid valve 56 reduces the third line pressure $P_M$, which is the original pressure, to hydraulic pressure $P_{SOL}$ (signal pressure for controlling the slip state), and outputs the hydraulic pressure $P_{SOL}$. The third line pressure $P_M$ is the constant pressure generated by the third relief valve 68. The hydraulic pressure $P_{SOL}$ increases as the drive electric current $I_{SOL}$ from the electronic control unit 42 increases. The hydraulic pressure $P_{SOL}$ is applied to the disengagement-side oil chamber 33 via the lock-up relay valve 52 that is placed in the first position. As a result, the hydraulic pressure in the disengagement-side oil chamber 33 becomes equal to the hydraulic pressure $P_{SOL}$. When the hydraulic pressure $P_{SOL}$ is reduced to the drain pressure, the lock-up clutch 32 becomes completely engaged. However, if the hydraulic pressure $P_{SOL}$ increases, the engagement capacity of the lock-up clutch 32 decreases and the lock-up clutch 32 starts to slip. That is, the slip amount is changed by changing the hydraulic pressure $P_{SOL}$.

Figure 4:
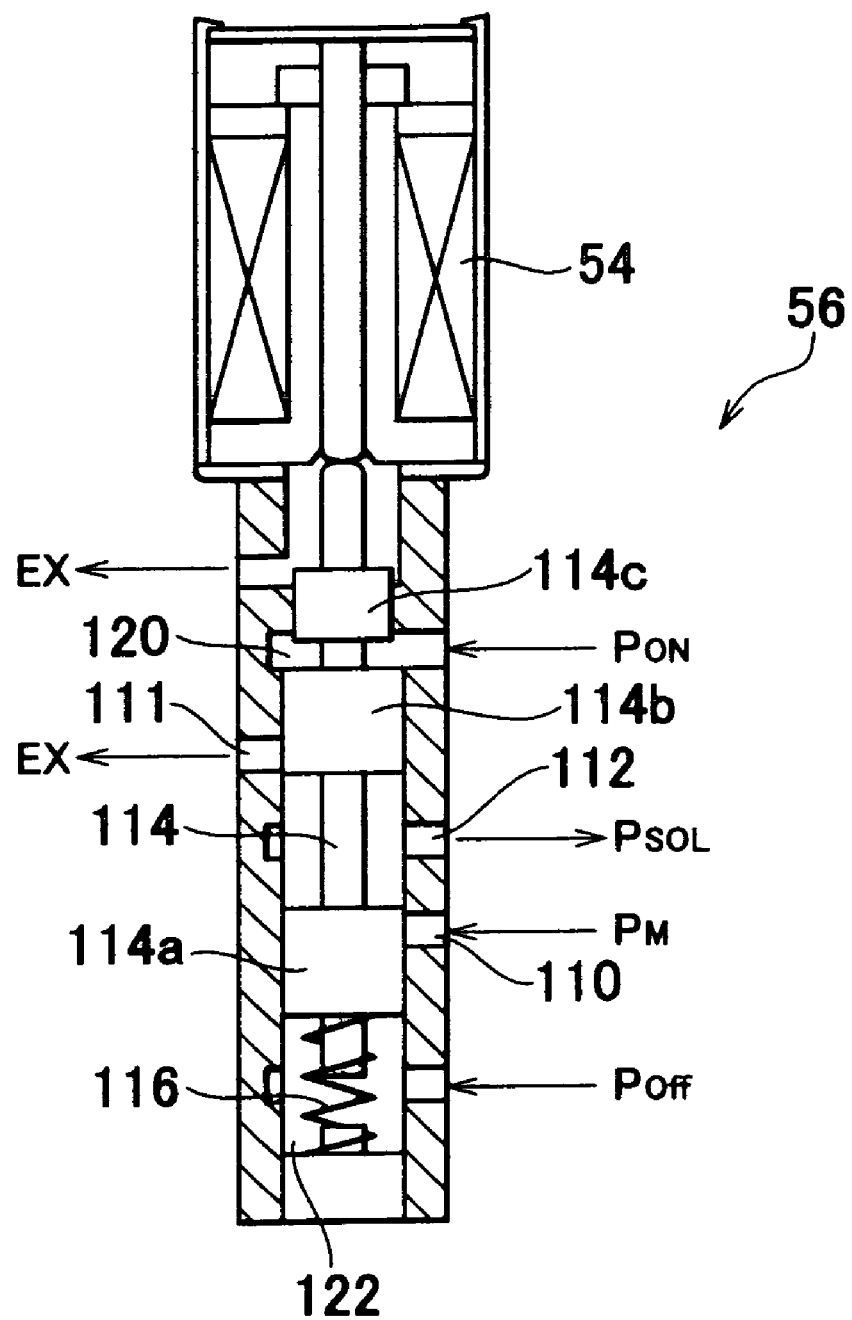
FIG. 4 illustrates a cross sectional view showing the configuration of a linear solenoid valve shown in FIG. 3.

FIG. 4 illustrates a cross sectional view showing the configuration of the linear solenoid valve 56 in detail. In FIG. 4, the linear solenoid valve 56 includes an input port 110; a drain port 111; an output port 112; a spool valve element 114; a spring 116; a linear solenoid 54; an oil chamber 120; and an oil chamber 122. The modulator pressure (third line pressure) $P_M$ is supplied to the input port 110. The hydraulic pressure $P_{SOL}$ is output from the output port 112. The spool valve element 114 moves in the axial direction to permit and interrupt communication between the input port 110 and the output port 112. The spring pushes the spool valve element 114 to a closed position. The linear solenoid 54 directly applies the thrust to push the spool valve element 114 toward an open position, according to the drive electric current $I_{SOL}$. If the oil chamber 120 receives the engagement-side pressure $P_{ON}$ in the engagement-side oil chamber 35, the engagement-side pressure $P_{ON}$ is applied to the spool valve element 114, which generates the thrust to push the spool valve element 114 toward the open position. The spring 116 is housed in the oil chamber 122. If the oil chamber 122 receives the disengagement-side oil pressure $P_{OFF}$ in the disengagement-side oil chamber 33, the disengagement-side oil pressure $P_{OFF}$ is applied to an end surface of the spool valve element 114, which generates the thrust to push the spool valve element 114 toward the closed position. The linear solenoid 54 is a known electromagnetic solenoid. The electromagnetic force output from the liner solenoid 54 is continuously increased as the drive electric current $I_{SOL}$ increases.

In the linear solenoid valve 56 having the aforementioned configuration, the electromagnetic force required to push the spool valve element 114 to an open position is determined according to the equation (1) described below.

$$F_{SOL} = F_{OFF} + F_S - F_{ON} \quad (1)$$

In this equation (1), $F_{SOL}$ represents an electromagnetic force (thrust) that is applied from the linear solenoid 54 to the spool valve element 114 to push the spool valve element 114 toward the open position. $F_{ON}$ represents a thrust to push the spool valve element 114 toward the open position, based on the engagement-side pressure $P_{ON}$ in the engagement-side oil chamber 35. $F_{OFF}$ represents a thrust to push the spool valve element 114 toward the closed position, based on the disengagement-side pressure $P_{OFF}$ in the disengagement-side oil chamber 33. $F_S$ is the thrust of the spring 116 to push the spool valve element 114 toward the closed position. That is, the spool valve element 114 is operated so that the electromagnetic force $F_{SOL}$ to push the spool valve element 114 toward the open position becomes equal to the sum of the thrust ($F_{OFF}-F_{ON}$) and the thrust $F_S$ of the spring. The thrust ($F_{OFF}-F_{ON}$) corresponds to the pressure difference $\Delta P$ ($=P_{ON}-P_{OFF}$) between the engagement-side pressure $P_{ON}$ in the engagement-side oil chamber 35 and the disengagement-side pressure $P_{OFF}$ in the disengagement-side oil chamber 33. Therefore, the hydraulic pressure $P_{SOL}$ output from the linear solenoid valve 56 can be adjusted so that the pressure difference $\Delta P$ becomes a desirable value. The thrust $F_{ON}$ to push the spool valve element 114 toward the open position based on the engagement-side pressure $P_{ON}$ is represented by an equation (2) described below.

$$F_{ON}=P_{ON}\times(A_1-A_2) \quad (2)$$

In the equation (2), $A_1$ represents the cross sectional area of a land 114a of the spool valve element 114 on the side of the oil chamber 122 (i.e., on the side of the spring 116) and the cross sectional area of an intermediate land 114b. $A_2$ represents the cross sectional area of a land 114c of the spool valve element 114 on the side of the linear solenoid 54. The thrust $F_{OFF}$ to push the spool valve element 114 toward the closed position based on the disengagement-side pressure $P_{OFF}$ is represented by an equation (3).

$$F_{OFF}=P_{OFF}\times A_1 \quad (3)$$

While the engagement capacity of the lock-up clutch 32 is controlled, that is, the slip amount is controlled, the hydraulic pressure $P_{SOL}$ output from the linear solenoid valve 56 is supplied to the disengagement-side oil chamber 33 via the lock-up relay valve 52 that is placed in the first position, and the disengagement-side pressure $P_{OFF}$ becomes equal to the hydraulic pressure $P_{SOL}$. At the same time, the second line pressure $P_2$ is supplied to the engagement-side oil chamber 35 via the lock-up relay valve 52, and the engagement-side pressure $P_{ON}$ becomes equal to the second line pressure $P_2$. Therefore, the hydraulic pressure $P_{SOL}$ in the lock-up relay valve 52 is represented by an equation (4) described below. The equation (4) is derived from the equations (1), (2), and (3).

$$P_{SOL}=[F_{SOL}-F_S+P_{ON}(A_1-A_2)]/A_1 \quad (4)$$

In the equation (4), $F_S$ and $P_{ON}$ ($A_1-A_2$) are constant values. The electromagnetic force (thrust) $F_{SOL}$ of the linear solenoid 54 is the function of the drive electric current $I_{SOL}$. Therefore, the hydraulic pressure $P_{SOL}$ corresponds one to one with the drive electric current $I_{SOL}$. The hydraulic pressure $P_{SOL}$, the pressure difference $\Delta P(=P_{ON}-P_{OFF})$ caused by the hydraulic pressure $P_{SOL}$, and the slip amount corresponding to the pressure difference $\Delta P$ are controlled by the drive electric current $I_{SOL}$.

In the linear solenoid valve 56, as the disengagement-side pressure $P_{OFF}(=P_{SOL})$ in the disengagement-side oil chamber 33 increases, the thrust $F_{OFF}$ to push the spool valve element 114 toward the closed position based on the disengagement-side pressure $P_{OFF}$ also increases. Therefore, if the disengagement-side pressure $P_{OFF}$ is about to increase for some reason, the thrust $F_{OFF}$ increases, which suppress the increase in the disengagement-side pressure $P_{OFF}$, and suppresses the change in the pressure difference $\Delta P(=P_{ON}-P_{OFF})$. If the engagement-side pressure $P_{ON}$ increases, the thrust to push the spool valve element 114 toward the open position based on the engagement-side pressure $P_{ON}$ increases. Therefore, if the engagement-side pressure $P_{ON}$ is about to increase, the thrust $F_{ON}$ and the hydraulic pressure $P_{SOL}$ are increased, which suppresses the change in the pressure difference $\Delta P(=P_{ON}-P_{OFF})$. That is, the pressure difference $\Delta P(=P_{ON}-P_{OFF})$ corresponding to the drive electric current $I_{SOL}$ can be reliably obtained using the linear solenoid valve 56, irrespective of external disturbance. The oil chambers 120 and 122 function also as feedback chambers that reflect the actual engagement-side pressure $P_{ON}$ and the disengagement-side pressure $P_{OFF}$ in the operation for adjusting the pressure.

Referring again to FIG. 1, the electronic control unit 42 is a so-called microcomputer that includes a CPU 182, a ROM 184, a RAM 186, and an interface (not shown). The electronic control unit 42 receives signals indicating a throttle valve opening amount θth, an engine rotational speed Ne (the rotational speed $N_P$ of the pump impeller, which corresponds to the input-side rotational speed of the lock-up clutch 32), an input-shaft rotational speed $N_{IN}$ (the rotational speed $N_T$ of the turbine runner, that is, the output-side rotational speed of the lock-up clutch 32), an output-shaft rotational speed $N_{OUT}$, the operation position $P_S$ of the shift operation lever 196, from a throttle sensor 188, an engine rotational speed sensor 190, an input shaft rotation sensor 192, a counter shaft rotation sensor 194, and an operation position sensor 198, respectively. The throttle sensor 188 detects the opening amount of the throttle valve provided in an intake pipe of the engine 10. The engine rotational speed sensor 190 detects the rotational speed of the engine 10. The input shaft rotation sensor 192 detects the rotational speed of the input shaft 20 of the automatic transmission 14. The counter shaft rotation sensor 194 detects the rotational speed of the counter shaft 40 of the automatic transmission 14. The operation position sensor 198 detects the operation position of the shift operation lever 196, that is, one of the L, S, D, N, R, P ranges. The CPU 182 of the electronic control unit 42 processes the input signals according to programs stored in the ROM 184 using a temporary storage function of the RAM 186. By processing the input signals, the CPU 182 controls the first electromagnetic valve 46, the second electromagnetic valve 48, the third electromagnetic valve 50, and the linear solenoid valve 56, thereby controlling shifting of the automatic transmission 14 and engagement of the lock-up clutch 32.

In the shifting control, the shift diagram corresponding to the actual shift speed is selected from a plurality of shift diagrams that are stored in the ROM 184 in advance. The shift speed is determined based on the vehicle speed that is calculated based on the running state of the vehicle, such as the throttle valve opening amount θth and the output-shaft rotational speed $N_{OUT}$. Then, by driving the first electromagnetic valve 46 and the second electromagnetic valve 48, the clutches C0, C1, and C2, and the brakes B0, B1, B2, and B3 are controlled to achieve one of the forward four shift speeds, which has been determined. FIG. 2 shows the shift speed in each shift range of the shift operation lever 196, and the operation states of the solenoids, clutches, brakes, and one-way clutches when each shift speed is achieved. A circle in a solenoid section indicates the excited state, and a cross mark in the solenoid section indicates the non-excited state. Also, a circle in a clutch section or in a brake section indicates the engaged state, and a blank indicates the nonengaged state. Further, a circle in a one-way clutch section indicates that the one-way clutch is engaged when the engine drives the wheels, and a blank indicates that the one-way clutch is not engaged when the engine drives the wheels.

In the control of the lock-up clutch 32, it is determined whether the running state of the vehicle is in a disengagement region, a slip control region, or an engagement region based on the output-shaft rotational speed (vehicle speed) $N_{OUT}$ and the throttle valve opening amount θth, according to a map indicating a known relation between the running state of the vehicle and the state of the lock-up clutch 32, which is stored in the ROM 184 in advance. This map is selected from a plurality of maps that are stored in advance, according to the actual shift speed. In the map, a slip control region is provided in the disengagement region such that the slip control is executed at a low throttle valve operation amounts. The slip control region is provided to absorb torque fluctuations of the engine 10 to improve the fuel efficiency without adversely affecting the driveability while maintaining the effect of engagement.

If it is determined that the running state of the vehicle is in the engagement region, the third electromagnetic valve 50 is excited, and the lock-up relay valve 52 is placed in the first position. At the same time, the drive electric current $I_{SOL}$ supplied to the linear solenoid valve 56 is set to the minimum electric current (rated value). As a result, the lock-up clutch 32 engages. If it is determined that the running state of the vehicle is in the disengagement state, the third electromagnetic valve 50 is not excited, and the lock-up relay valve 52 is placed in the second position. As a result, the lock-up clutch 32 disengages. If the running state of the vehicle is in the slip control region, the third electromagnetic valve 50 is excited, and the lock-up relay valve 52 is placed in the first position. At the same time, the drive electric current $I_{SOL}$ for the linear solenoid valve 56 is adjusted. For example, the drive electric current $I_{SOL}$ for the linear solenoid valve 56 is calculated so that a deviation $\Delta N(=N_{SLIP}-N_{SLIP}T)$ of an actual slip rotational speed $N_{SLIP}(=N_E-N_T)$ from a target slip rotational speed $N_{SLIP}T$ is eliminated, and the calculated drive electric current $I_{SOL}$ is output. The drive electric current $I_{SOL}$ does not need to be supplied to the linear solenoid valve 56 simultaneously with excitation of the third electromagnetic valve 50. However, the drive electric current $I_{SOL}$ is supplied to the linear solenoid valve 56 so that the spool valve element 114 of the linear solenoid valve 56 is in a slip control position when the slip control is started, before the lock-up relay valve 52 is completely switched to the second position.

As described above, according to the embodiment, the lock-up clutch 32 is engaged by placing the lock-up relay valve 52 in the first position, and is disengaged by placing the lock-up relay valve 52 in the second position. When the lock-up clutch 32 is engaged, the hydraulic pressure $P_{SOL}$ is supplied to the disengagement-side oil chamber 33 of the torque converter 12 from the linear solenoid valve 56. Also, the pressure difference $\Delta P(=P_{ON}-P_{OFF})$ between the engagement-side oil chamber 35 and the disengagement-side oil chamber 33 is applied to the spool valve element 114 of the linear solenoid valve 56. That is, the spool valve element 114 is driven such that the electromagnetic force applied from the linear solenoid 54 becomes equal to the pressure difference $\Delta P$. Therefore, the hydraulic pressure $P_{SOL}$ can be reliably adjusted so that the pressure difference $\Delta P$ becomes equal to a desirable value. That is, engagement, disengagement, and slip of the lock-up clutch 32 can be controlled using the two valves, i.e., the lock-up relay valve 52 and the linear solenoid valve 56. Accordingly, a lock-up control valve employed in the conventional hydraulic control apparatus is eliminated. This simplifies the configuration and reduces the size of the hydraulic control apparatus for the torque converter 12 with the lock-up clutch 32.

Also, in the embodiment, when the lock-up relay valve 52 is placed in the first position, the hydraulic pressure $P_{SOL}$ output from the linear solenoid valve 56 is applied to the disengagement-side oil chamber 33. Therefore, if the hydraulic pressure $P_{SOL}$ output from the linear solenoid valve 56 is zero, the lock-up clutch 32 of the torque converter 12 is engaged. If the hydraulic pressure $P_{SOL}$ increases, the pressure difference $\Delta P(=P_{ON}-P_{OFF})$ between the engagement-side oil chamber 35 and the disengagement-side oil chamber 33 decreases, and the engagement capacity of the lock-up clutch 32 decreases. Therefore, the slip of the lock-up clutch 32 can be controlled.

In the embodiment, the spool valve element 114 of the linear solenoid valve 56 permits and interrupts communication between the output port 112 and the input port 110. The hydraulic pressure $P_{SOL}$ is output from the output port 112. The original pressure (modulator pressure $P_M$) is supplied to the input port 110. The spool valve element 114 is driven according to the aforementioned equation (1). That is, the spool valve element 114 is driven so that the electromagnetic force $F_{SOL}$ to push the spool valve element 114 toward the open position is equal to the sum of the thrust $(F_{OFF}-F_{ON})$ and the thrust $F_S$ of the spring. The thrust $(F_{OFF}-F_{ON})$ corresponds to the pressure difference $\Delta P$ $(=P_{ON}-P_{OFF})$ between the engagement-side pressure $P_{ON}$ in the engagement-side oil chamber 35 and the disengagement-side pressure $P_{OFF}$ in the disengagement-side oil chamber 33. Therefore, the hydraulic pressure $P_{SOL}$ output from the linear solenoid valve 56 can be adjusted so that the pressure difference $\Delta P$ becomes a desirable value.

Next, another embodiment of the invention will be described. The same or corresponding portions as in the described embodiment will be denoted by the same reference numerals.

Figure 5:
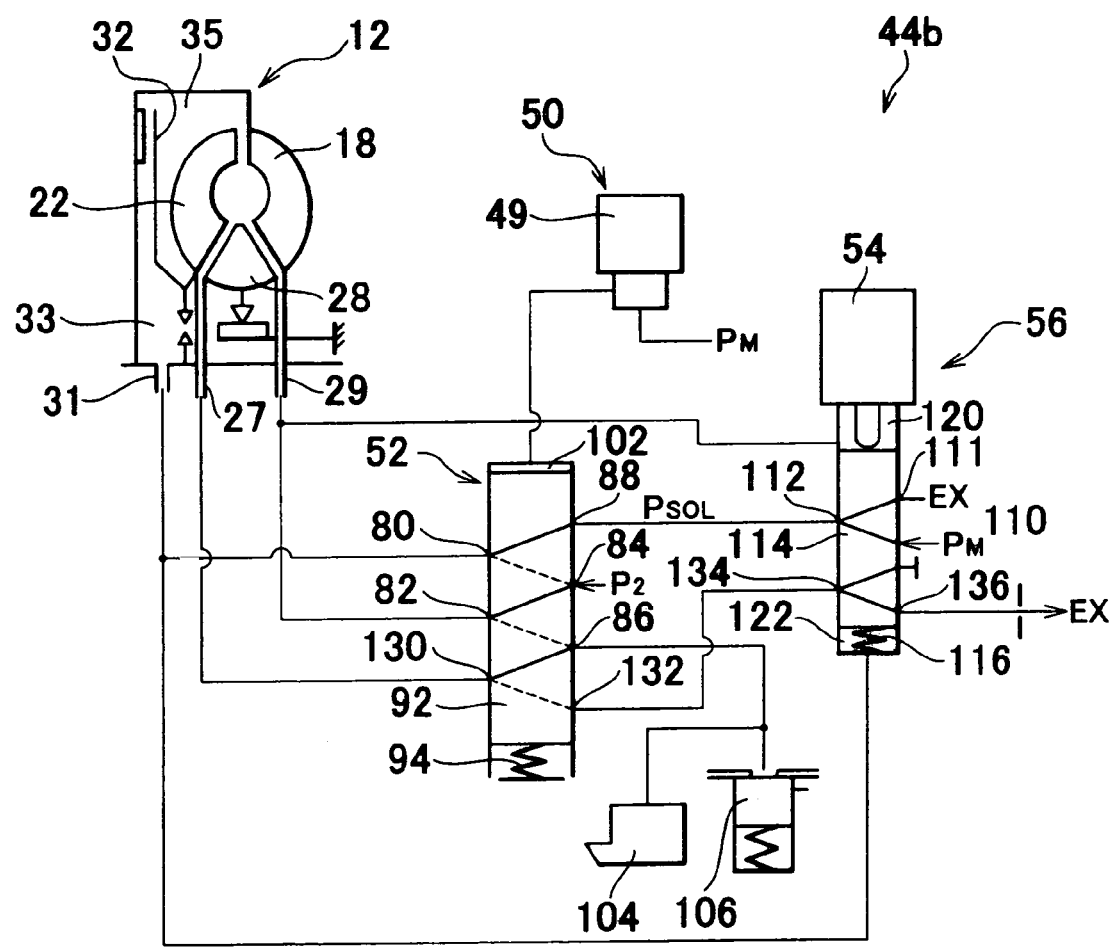
FIG. 5 illustrates a diagram showing the configuration of the main portion of a hydraulic control circuit according to another embodiment of the invention.
Figure 6:
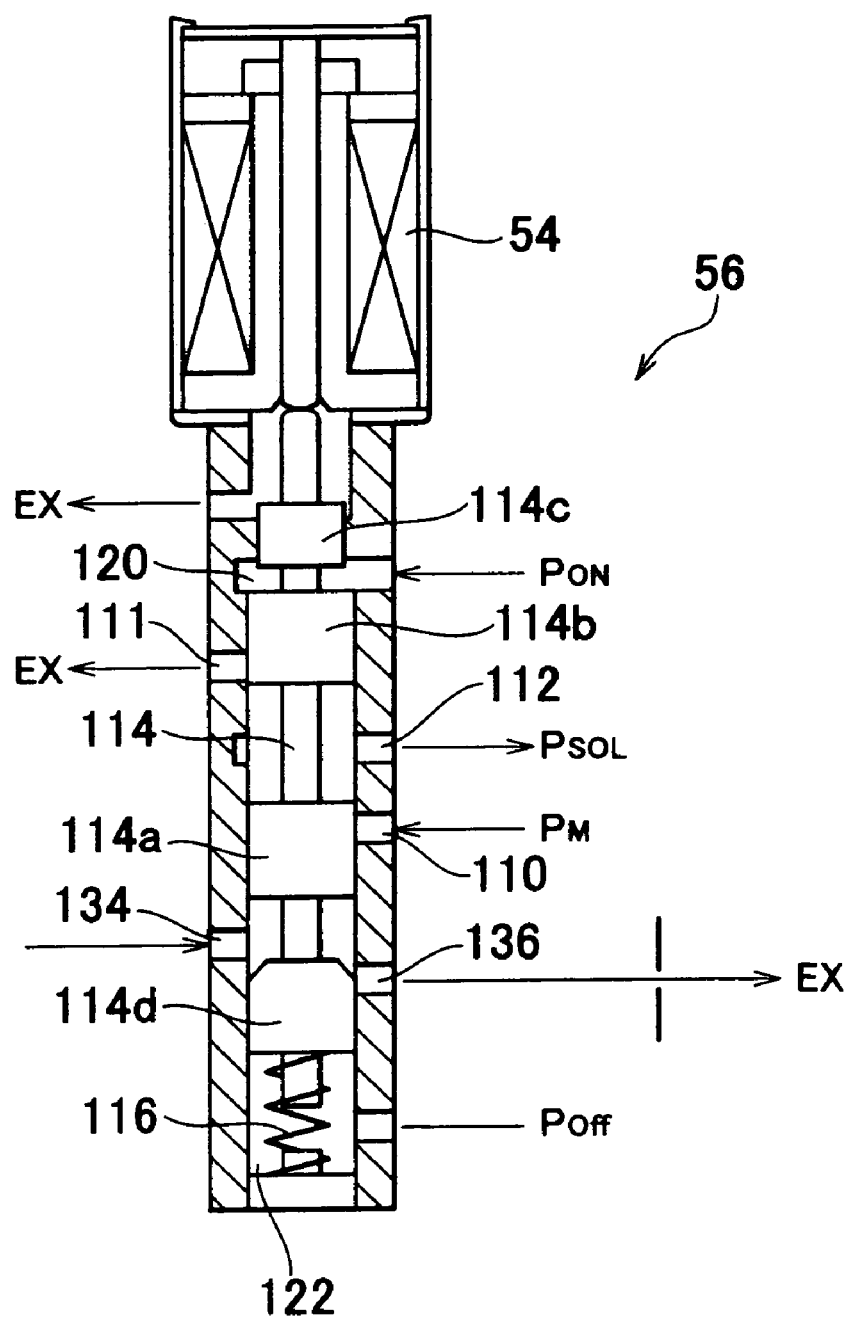
FIG. 6 illustrates a cross sectional view showing the configuration of a linear solenoid valve according to another embodiment of the invention shown in FIG. 5.

FIG. 5 illustrates a diagram showing the configuration of the main portion of the hydraulic clutch-control circuit 44b according to another embodiment of the invention. FIG. 6 illustrates a cross sectional view showing the configuration of the linear solenoid valve 56 used in the hydraulic clutch-control circuit 44b according to the embodiment of the invention shown in FIG. 5.

In FIGS. 5 and 6, the torque converter 12 includes a disengagement-side port 31; a first engagement-side port 29; and a second engagement-side port 27. Communication is provided between the disengagement-side oil chamber 33 and the disengagement-side port 31d, and also between the engagement-side oil chamber 35 and each of the first engagement-side port 29 and the second engagement-side port 27. That is, the torque converter 12 is a so-called three-way torque converter. In the three-way torque converter 12, the hydraulic oil is permitted to flow from the engagement-side oil chamber 35, that is, the hydraulic oil flows from the engagement-side port 29 to the second engagement-side port 27 even if the lock-up clutch 32 is engaged. If the lock-up relay valve 52 is placed in the first position, a second engagement-side port 130, which is connected to the second engagement-side port 27 of the torque converter 12, is connected to a first exhaust port 86 due to the spool valve element 92. As a result, the hydraulic oil discharged from the engagement-side oil chamber 35 of the torque converter 12 is circulated via the cooler 104 even if the lock-up clutch 32 is engaged. If the lock-up relay valve 52 is placed in the second position, the second engagement-side port 130, which is connected to the second engagement-side port 27 of the torque converter 12, is connected to a second exhaust port 132. As a result, the hydraulic oil is discharged via the linear solenoid valve 56.

The spool valve element 114 of the linear solenoid valve 56 includes the land 114a and the land 114d. The land 114d is closer to the spring 116 than the land 114a is. The land 114d permits and interrupts communication between the port 134 and the exhaust port 136. The port 134 is connected to the second exhaust port 132. As the spool valve element 114 moves toward the oil chamber 122, that is, as the hydraulic pressure $P_{SOL}$ increases, the amount of hydraulic oil discharged from the engagement-side oil chamber 35 increases. As a result, even if the lock-up clutch 32 is engaged, the hydraulic oil is supplied to the engagement-side oil chamber 35 through the first engagement-side port 29, and the hydraulic oil is discharged through the second engagement-side port 27. Also, the amount of hydraulic oil discharged to the port 134 through the ports 130 and 132 of the lock-up relay valve 52 increases with the increase in the hydraulic pressure $P_{SOL}$ supplied to the disengagement-side oil chamber 33 of the torque converter 12, that is, the increase in the slip amount of the lock-up clutch 32. This suppress overheating of the torque converter 12.

According to this embodiment, the same effects as those obtained in the described embodiment can be obtained. In addition, even if the lock-up clutch 32 is engaged, the hydraulic oil in the engagement-side oil chamber 35 is circulated, and the amount of circulated hydraulic oil increases as the hydraulic pressure $P_{SOL}$ increases, that is, as the slip amount of the lock-up clutch 32 increases. This appropriately suppresses overheating of the torque converter 12.

Although the embodiments have been described with reference to the drawings, the invention may be realized in other embodiments.

For example, in the hydraulic clutch-control circuit 44b, the first relief valve 62 that generates the first line pressure $P_1$, and the second relief valve 66 that generates the second line pressure $P_2$ are provided. The second line pressure $P_2$ is used as the original pressure supplied to the torque converter 12. However, the original pressure does not need to be the second pressure $P_2$ generated by the second relief valve 66. The original pressure may be the first line pressure $P_1$ generated by the first relief valve 62. Alternatively, the original pressure may be a pressure generated by another relief valve, or a pressure that is not generated by a relief valve.

In the hydraulic clutch-control circuit 44b according to the described embodiment, the third relief valve 68 generates the constant modulator pressure $P_M$, and the modulator pressure $P_M$ is used as the original pressure supplied to the third electromagnetic valve 50 and the linear solenoid valve 56. However, the original pressure supplied to the third electromagnetic valve 50 and the linear solenoid valve 56 does not need to be the modulator pressure $P_M$ generated by the third relief valve 68. The original pressure may be the first line pressure $P_1$ generated by the first relief valve 62 or the second line pressure $P_2$ generated by the second relief valve 66. Alternatively, the original pressure may be a pressure generated by another relief valve, or a pressure that is not generated by a relief valve.

In the described embodiments, various modifications may be made to the lock-up relay valve 52 or the linear solenoid valve 56 as long as the function thereof is not changed. For example, the positions of the springs 94 and 116, the configurations of the oil chambers, spool valve elements 92 and 114 may be changed.

In the described embodiments, a stepped automatic transmission 14 with a planetary gear unit is provided downstream of the torque converter 12. However, a continuously variable transmission may be provided downstream of the torque converter 12.

In the described embodiments, the torque converter 12 with the lock-up clutch is employed. Alternatively, however, a fluid coupling with a lock-up clutch may be employed. In other words, any hydraulic power transmission having a lock-up clutch may be employed.

While the invention has been described with reference to example embodiments thereof, it is to be understood that the invention is not limited to the example embodiments or constructions. To the contrary, the invention is intended to cover various modifications and equivalent arrangements. In addition, while the various elements of the example embodiments are shown in various combinations and configurations, which are exemplary, other combinations and configurations, including in the spirit and scope of the invention.

What is claimed is:

1. A hydraulic control apparatus for a hydraulic power transmission with a lock-up clutch, where the lock-up clutch operates in accordance with a pressure difference between an engagement-side oil chamber and a disengagement-side oil chamber, comprising:
    (a) a lock-up relay valve which is switched between a first position and a second position by a switching electromagnetic solenoid, wherein: when the first position of the lock-up relay valve is selected hydraulic pressure is supplied to the engagement-side oil chamber; and when the second position of the lock-up relay valve is selected hydraulic pressure is supplied to the disengagement-side oil chamber; and
    (b) a linear solenoid valve, which includes a spool valve element driven using an electromagnetic force, that adjusts hydraulic pressure output from the linear solenoid valve, wherein:
    an oil passage is provided through which the hydraulic pressure output from the linear solenoid valve is supplied to the disengagement-side oil chamber via the lock-up relay valve when the lock-up relay valve is in the first position; and
    oil passages are respectively provided through which hydraulic pressure in the engagement-side oil chamber is applied to one end of the spool valve element of the linear solenoid valve, and hydraulic pressure in the disengagement-side oil chamber is applied to the other end of the spool valve element.

2. The hydraulic control apparatus according to claim 1, wherein the lock-up relay valve applies the hydraulic pressure output from the linear solenoid valve to the disengagement-side oil chamber when the lock-up relay valve is placed in the first position.

3. The hydraulic control apparatus according to claim 1, wherein:
    the spool valve element of the linear solenoid valve permits and interrupts communication between an output port from which the hydraulic pressure is output and an input port to which original pressure is supplied; and
    the electromagnetic force required to push the spool valve element to an open position is determined according to an equation, $F_{SOL}=F_{OFF}+F_S-F_{ON}$, where $F_{SOL}$ represents the electromagnetic force to push the spool valve element to the open position, $F_{ON}$ represents a thrust to push the spool valve element to the open position based on the hydraulic pressure in the engagement-side oil chamber, $F_{OFF}$ represents a thrust to push the spool valve element to a closed position based on the hydraulic pressure in the disengagement-side oil chamber, and $F_S$ is a thrust of a spring to push the spool valve element to the closed position.

4. The hydraulic control apparatus according to claim 1, wherein:

the hydraulic power transmission includes a disengagement-side port, a first engagement-side port, and a second engagement-side port;

communication is provided between the disengagement-side oil chamber and the disengagement-side port;

communication is provided between the engagement-side oil chamber and each of the first engagement-side port and the second engagement-side port; and when the lock-up clutch is engaged, hydraulic oil which is supplied to the first engagement-side port, flows in the engagement-side oil chamber, and flows out from the second engagement-side port is circulated and returns back to the engagement-side oil chamber via the lock-up relay valve and the linear solenoid valve.

* * * * *